E. NOEL.
UNIVERSAL JOINT.
APPLICATION FILED SEPT. 20, 1920.

1,389,971.

Patented Sept. 6, 1921.

INVENTOR.
Eli Noel.
By M. C. Gillham.
Attorney.

UNITED STATES PATENT OFFICE.

ELI NOEL, OF KANSAS CITY, MISSOURI.

UNIVERSAL JOINT.

1,389,971.  Specification of Letters Patent.  Patented Sept. 6, 1921.

Application filed September 20, 1920. Serial No. 411,387.

*To all whom it may concern:*

Be it known that I, ELI NOEL, a citizen of the United States, residing at Kansas City, in the county of Jackson and State of Missouri, have invented a new and useful Universal Joint, of which the following is a specification.

My invention relates to universal joints, and the object of my invention is to provide a cheap, durable, flexible joint of unusual flexibility and efficiency.

Figure 1:
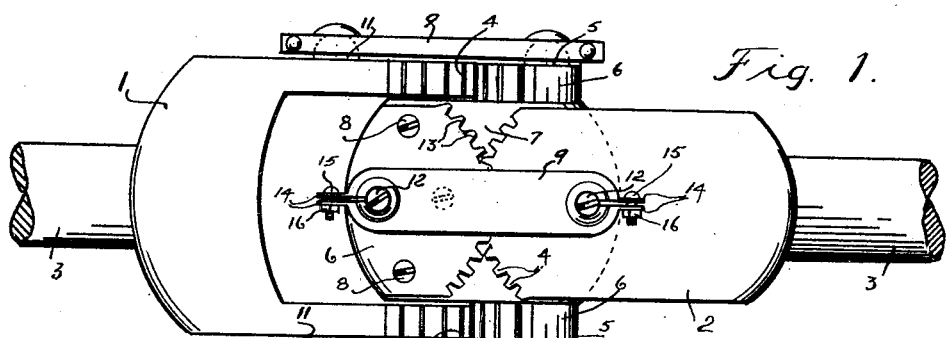
Figure 2:
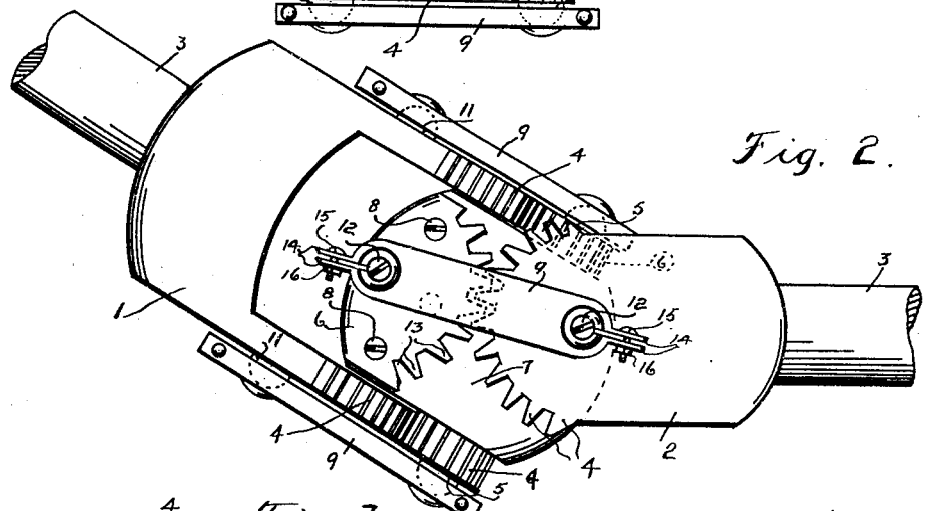
Figure 3:
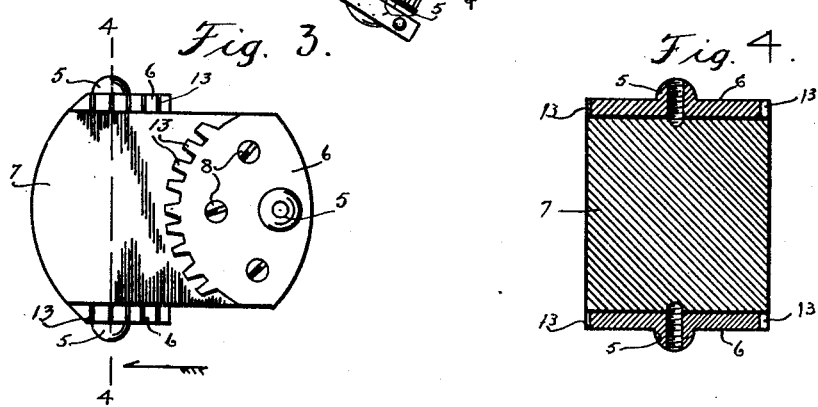
Figure 4:
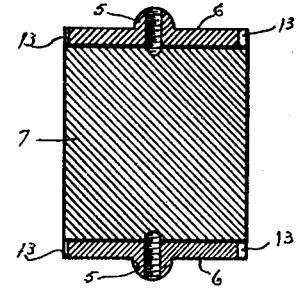
Figure 5:
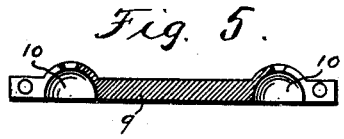

I attain these objects by the mechanism illustrated in the accompanying drawing, in which—Figure 1, is a side elevation of a universal joint embodying my invention. Fig. 2, is the same, and showing the same flexed. Fig. 3, is a side elevation of the central body member, and showing the toothed wheel segments thereon. Fig. 4, is a vertical section of the body member, and showing the method of pivoting the connecting bars, taken on the line 4—4, in Fig. 3, and Fig. 5, is a longitudinal section of the connecting bars.

Similar numerals of reference refer to corresponding parts throughout the several views.

The universal joint consists of two knuckle joint members 1 and 2, having shafts 3, and on their inner ends wheel segments having teeth 4. Ball pivots 5, are formed integral with toothed wheel segments 6, which are mounted on alternate end portions of the side portions of the body member 7, by screws 8. Connecting bars 9, having inverted sockets 10, therein for receiving the ball pivots 5, at one end thereof and at their other ends ball pivots 11, which are formed integral with the outer sides of the limbs of the knuckle joint members, pivotally connect the body member with the latter. Screws 12, are arranged to loosely pierce the sockets 10, and penetrate the ball pivots 5 and 11. Teeth 13, are formed on the respective wheel segments 6, and are meshed with the teeth 4, on the respective knuckle joint members. The end portions of the bars 9, are slotted inwardly and open into the sockets 10, thereby forming yielding clamps 14, which are pierced suitably by bolts 15, having nuts 16, for the relative adjustment of the sockets and ball pivots to take up waste.

To assemble the universal joint the limbs of the respective knuckle joint members 1 and 2, are slidably arranged on opposite sides of the body member 7, and in such a manner that the teeth 4, thereon are enmeshed with the teeth 13, on the respective segments 6, and, thereafter, the connecting bars 9 are mounted on the ball pivots 5 and 11, and the screws 12, then set to place. If it is desired to adjust the bars on the pivots the bolts 15, are tightened or loosened as may seem to be required. The universal joint embodying my invention is capable of great flexibility and it may transmit and receive power at greater angles than is possible in the usual square type joints. It may be made of any suitable metal or material and the well known pivot pins may be used in place of the ball pivots shown and described, without departing from my invention or the scope of the appended claim.

Having described my invention what I claim is—

A universal joint, consisting of a centrally disposed body member having plane sides, toothed wheel segments mounted on alternate end portions of the sides of said body member, a knuckle joint member slidably bearing on the vertical sides of said body member and having toothed wheel segments enmeshed with toothed wheel segments thereon, a knuckle joint member slidably bearing on the horizontal sides of said body member and having toothed wheel segments enmeshed with toothed wheel segments thereon, coupling bars pivoting on the axial centers of said toothed wheel segments on said body member and also pivoting on said knuckle joint members, and shafts combined with said knuckle joint members.

Signed at Kansas City, in the county of Jackson and State of Missouri, this 14th day of September, 1920.

ELI NOEL.

Witnesses:
T. DAHLSTROM,
BATTLE MCCARDLE.